United States Patent [19]

Carroll

[11] Patent Number: 4,860,228

[45] Date of Patent: Aug. 22, 1989

[54] NON-VOLATILE MEMORY INCREMENTAL COUNTING SYSTEM

[75] Inventor: Christopher J. Carroll, Streamwood, Ill.

[73] Assignee: Motorola, Inc., Schaumburg, Ill.

[21] Appl. No.: 18,148

[22] Filed: Feb. 24, 1987

[51] Int. Cl.[4] .......................... G01B 7/00; G06F 7/00
[52] U.S. Cl. .................................. 364/561; 364/300;
364/969; 364/971; 364/925; 364/222.4;
364/246.6; 364/264.6; 377/24.1; 235/95;
365/228
[58] Field of Search ............. 364/200, 900, 300, 561,
364/550, 551; 340/173, 870.02; 377/17, 24.1;
235/95; 365/189, 226, 228

[56] References Cited

U.S. PATENT DOCUMENTS

| | | | |
|---|---|---|---|
| 3,420,988 | 1/1969 | Hunt et al. | 377/51 |
| 3,808,407 | 4/1974 | Ratz | 377/44 |
| 3,864,552 | 2/1975 | Phillips | 377/5 |
| 3,916,390 | 10/1975 | Chang et al. | 340/173 |
| 3,950,737 | 4/1976 | Uchida et al. | 340/173 |
| 4,244,514 | 1/1981 | Nomura et al. | 377/24.1 |
| 4,263,657 | 4/1981 | Oka et al. | 377/17 X |
| 4,281,389 | 7/1981 | Smith | 364/569 |
| 4,320,451 | 3/1982 | Bachman et al. | 364/200 |
| 4,374,409 | 2/1983 | Bienvenu et al. | 364/200 |
| 4,382,178 | 5/1983 | Mori | 377/17 |
| 4,393,470 | 7/1983 | Miard | 364/200 |
| 4,395,757 | 7/1983 | Bienvenu et al. | 364/200 |
| 4,442,484 | 4/1984 | Childs, Jr. et al. | 364/200 |
| 4,528,683 | 7/1985 | Henry | 377/24.1 |
| 4,559,637 | 12/1985 | Weber | 377/24 |
| 4,651,307 | 3/1987 | Toumayan et al. | 365/226 X |
| 4,658,351 | 4/1987 | Teng | 364/300 X |
| 4,663,770 | 5/1987 | Murray et al. | 377/24.1 X |
| 4,682,287 | 7/1987 | Mizuno et al. | 377/24.1 X |
| 4,710,888 | 12/1987 | Burke et al. | 377/24.1 X |
| 4,712,195 | 12/1987 | Finger | 365/228 |
| 4,757,522 | 7/1988 | Kieselstein | 377/24.1 X |

*Primary Examiner*—Gary Chin
*Assistant Examiner*—Joseph L. Dixon
*Attorney, Agent, or Firm*—Robert J. Crawford

[57] ABSTRACT

Disclosed is a technique for storing a count of incrementally increasing data exclusively in EEPROM using semaphores to avoid significant losses, as a result of power downs, greater than a single least significant bit in accuracy. The disclosed embodiment includes a first EEPROM register, comprised of 256 bits, for storing 256 incremental count increases, each bit is used to record an incremental count increase. A pair of 16 bit EEPROM registers is provided for incrementally storing updated count information in response to the first EEPROM register overflowing. Semaphores are provided for indicating whether or not the incrementally increasing count information has been at least partially stored in the pair of registers. Once an overflow from the first register is detected, the semaphores are checked to determine in what stage the update to the pair of registers was left (in case of power down). In response to the semaphore information, the overflow is stored in the pair of registers for a complete update of the count, and the semaphores are appropriately updated to so indicate.

9 Claims, 3 Drawing Sheets

NON-VOLATILE MEMORY INCREMENTAL COUNTING SYSTEM

FIELD OF THE INVENTION

This invention relates generally to storage systems suitable for use with non-volatile memory. The invention has particular application in settings where an increasing count of a high number of incremental pulses must be stored, as occurs with an automobile odometer.

BACKGROUND

With the increased acceptance of and demand for electronic display and information systems, as in automobiles, systems designers have been confronted with a variety of problems. Some of these problems relate to providing data output in a form most useful to viewer, and others relate simply to asthetic issues. One problem in particular, however, has presented a more serious issue because it touches upon both state and federal legal restrictions and requirements; the provision of an electronic odometer.

The task of the vehicle odometer can be described easily enough. The odometer must accurately measure and report the total distance the monitored vehicle has ever been driven. This information will be relied upon by maintenance personnel and by potential purchasers of the vehicle. An odometer that fails to accurately measure travelled distance, or that fails to accurately report this distance, can contribute to incorrect decisions by these persons.

Current mechanical odometers meet these needs by providing geared members that turn in accordance with a calibrated schedule that relates to the distance being travelled by the vehicle. Simply stated, when the vehicle moves, the gears turn and the odometer count advances. When the vehicle does not move, the gears do not move and the odometer readout remains quiescent though viewable.

Various solutions have been provided to allow the distance travelled by a vehicle to be electronically monitored. Similarly, a variety of display mechanisms are available to allow the odometer reading to be viewed. The problem with providing an electronic odometer, however, centers upon the memory mechanism. More particularly, many electronic memory units require the continued presence of electricity in order to support their storage function. Upon removing such electricity, the contents in memory are lost. Although such memory units can be supported by the vehicle battery, such batteries occasionally run down or must be disconnected to be replaced. At such time, the memory contents would be lost.

Some memory units, such as read only memory units (ROM's) are not susceptible to such a loss of memory upon disconnection of power. Unfortunately, such memory units cannot have information input into them except during the manufacturing process. Such memory units would therefore have obvious drawbacks in a odometer setting.

There are other memory units, known as EEPROMS (electrically erasable programmable read only memory), that provide non-volatile memory and that avoid these problems. These memory units will retain their contents in memory even in the absence of electric power. Further, these memory units can have specific memory locations selectively erased and re-written to during use by simply providing appropriate signals from a control unit, such as a microprocessor.

Unfortunately, even EEPROMS have a problem associated with their use; they can wear out. More particularly, each memory location has an expected erase/write cycle lifetime of 10,000 erase/write events. Since an odometer memory must have information regarding distance travelled entered into it on a highly regular basis (to ensure accuracy), the number of anticipated erase/write cycles can surpass the expected lifetime of the memory unit.

To compensate for this, some prior art systems use EEPROMS for storing information regarding the most significant bits of a particular count, and volatile memory for storing information regarding the least significant bits. By this compromise, EEPROM usage can be minimized somewhat to acceptable levels. Unfortunately, least significant bits data can be lost from time to time, and this can contribute to inaccuracy.

Other prior art systems have improved this technique by employing circuitry to detect a power down condition, at which time additional supporting circuitry provides an additional 30 milliseconds or so of power so that the least significant bits can be transferred to the EEPROM for non-volatile storage. Unfortunately, the cost of the extraneous hardware for detecting and supplying power is not tolerable in many applications.

There therefore exists a need for a non-volatile memory storage system that provides a non-volatile memory that may be satisfactorily utilized in an odometer setting, and that will meet specified needs for accuracy and anticipated lifetime.

SUMMARY AND OBJECTS OF THE INVENTION

It is an object of the present invention to provide a method for storing data in non-volatile memory in such a manner to overcome the above mention shortcomings.

It is a more particular object of the present invention to provide a method for storing data in a non-volatile memory to ensure that on power down a maximum of only a single bit, the least significant bit, of the count information may be lost.

It is an additional object of the present invention to provide a method for storing data in a non-volatile memory which does not require writing to EEPROM at power down and eliminates the need for hardware relating to the detection of a power down condition.

The invention may briefly be described in terms of a preferred embodiment involving an electronic odometer system. The system includes a method for storing odometer information in an 8 bit wide EEPROM to maintain a record of distance traveled by a vehicle. Three groups of EEPROM memory locations are used to accomplish the counting technique. The first group includes 32 bytes of EEPROM strung together to form a 256 bit block, referred to as C-block. This block is used for storing 256 incremental increases, one per bit, relating to an external odometer count signal, wherein each count signal represents about 1/10 of a mile. The second group of memory locations employed comprise two signals inherently provided by the EEPROM. They are used as first and second semaphores to avoid incorrect count updates as a result of power downs experienced by the odometer system. The last group comprises a first and second pair of AB registers, each of which represents two EEPROM bytes. The AB pairs are respectively used to represent a most significant portion (msp) and a least significant portion (lsp) portion of the odometer count information. The B portion is used for storing data in response to overflows from the C-block, and the A portion is used for storing data in response to overflows from the B portion. Additionally, the B portion is not updated unless the first semaphore indicates the step is appropriate. Similarly, the A portion is not updated unless the second semphore so indicates. After the A portion is updated the second semaphore is cleared and, finally, once the entire count information has been updated, the first semaphore is cleared, the C-block is cleared and the system is ready for additional external odometer count signals.

BRIEF DESCRIPTION OF THE DRAWINGS

The features of the present invention which are believed to be novel are set forth with particularity in the appended claims. The invention, together with further objects and advantages thereof, may best be understood by making reference to the following description taken in conjunction with the accompanying drawing, in which like reference numerals identify like elements, and wherein:

DETAILED DESCRIPTION OF THE PREFERRED EMBODIMENT

The non-volatile memory incremental counting system disclosed in this specification has particular use for electronic odometers as may be utilized in electronic displays information systems used in many vehicles. This system has particular applicability for use with systems wherein the distance traveled by the vehicle being monitored gives rise to a series of electric pulses that relate in number to the actual distance travelled. These pulses constitute an incrementally increasing data base that, when accurately counted, will reflect the total distance travelled by the vehicle.

In order to effectuate this system, a non-volatile memory unit is required. The non-volatile memory is preferably read and written to be an appropriate microcomputer, such as an MC6805R3 as manufactured by Motorola, Inc. The non-volatile memory may be provided through the use of a COP494E EEPROM as manufactured by National Semiconductor corporation.

Figure 1:
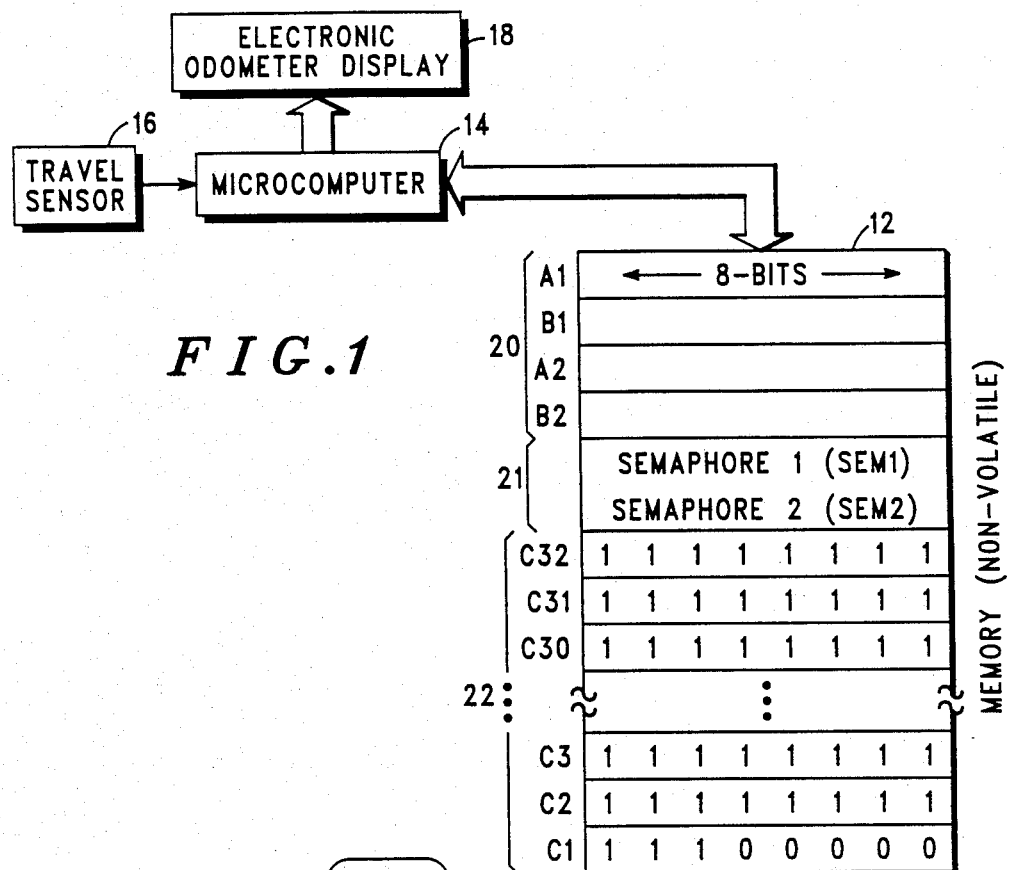
FIG. 1 is an odometer system which employs a counting technique in accordance with the present invention.

In FIG. 1, such an odometer system is depicted. The system includes an 8-bit/byte non-volatile memory 12, controlled by a microcomputer 14, a travel sensor 16 and an electronic (preferably LCD) odometer display 18. The travel sensor 16 is used to communicate to the microprocessor, a sequence of signals, each of which relates in number to the actual distanced travelled by the vehicle. The microcomputer 14 records the signals received by the travel sensor 16 in the non-volatile memory 12 and periodically retrieves the information therein and converts it to decimal form to accurately indicate the actual distance travelled for the odometer display 18.

The non-volatile memory 12 includes a diagrammatic depiction of the memory locations being utilized by the microcomputer 14 to accomplish the counting technique. There are three general groups of locations. The first group 20 of locations comprises four memory locations. These four locations are utilized as two pairs of AB memory locations (A1-B1 and A2-B2). Each AB pair is used to represent the two most significant bytes of a three byte number representing the actual distance travelled for the odometer display 18. The A memory location from each pair represents the most significant byte, while the B memory location from each pair represents the next most significant byte. As will be subsequently explained, one AB pair is used as a backup, in case of power down, for the other AB pair. The contents of each AB pair are therefore substantially related.

The next group 21 of memory locations requires only two bits, a first semaphore location (SEM1) and a second semaphore location (SEM2). When the first semaphore is set it indicates that the most recent programming to a B portion in the AB pairs was completed. Similarly, when the second semaphore is set it indicates that the most recent programming to an A portion in the AB pairs was completed. More specifically, when using an EEPROM as the non-volatile memory, the setting of each semaphore indicates that the charge pump of the EEPROM has been on for the full time when programming the respective A or B portion of the AB pair.

The last group 22 of memory locations comprises thirty-two bytes. As a group, these memory locations are used as though they were strung together in a cascaded fashion to form one 256 bit block, referred to as "C-block" (22). The C-block 22 is used by the microcomputer 14 to represent the least significant byte of the three byte number discussed above. The number of bits selected for the C-block corresponds to a predetermined number of external events (signals from the travel sensor 16) which will occur before an overflow occurs within the C-block. For example, presume the signal from the travel sensor 16 is an electronic pulse indicating the vehicle has traveled one tenth of a mile. If the C-block 22 is selected so that it will not overflow until after it reaches 25.6 miles, then 256 bits are required. As each signal from the travel sensor 16 is received, the microcomputer 14 stores a representative signal in one of the 256 C-block memory locations. This may be accomplished by setting a unique bit within C-block for each signal received from the travel sensor 16. After 25.6 miles, C-block will be full and the next subsequent signal from the travel sensor will force the C-block into an overflow condition, at which time the count in the AB pair is incremented and the C-block is erased. Details pertaining to the recording using the AB pairs will be subsequently discussed.

An example illustrating how an AB pair, in conjunction with C-block, may be utilized to represent a 3 byte (8 bits per byte) number follows:

| A | B | C-block |
|---|---|---|
| $12 | $AF | 1111111111111111 ... 111111100000 |

The number stored under A and B are in hexidecimal form. Although a number of implementations are available for storing the data in C-block, the sequential contiguous implementation shown above is stored in binary form with each zero representing one count. As a whole, these three bytes may be converted into the hexidecimal number "$12AF05". In decimal this number represents 1,224,453. Thus, the microcomputer has recorded 1,224,453 counts in the A/B/C-block memory locations. If each count represents one tenth of a mile, then the microcomputer would divide this number by 10 (to represent 122,445 miles) before recording it on the electronic odometer display.

It should be noted that this signal storing technique, through the use of C-block 22, alleviates the excessive writing problem which is prevalent in EEPROM. As previously discussed, each EEPROM memory location has an expected erase/write cycle lifetime of 10,000 erase/write events. Using the C-block (22) as described above, a 10,000 erase/write event lifetime allows for 256,000 miles of recording. This is determined as follows:

$$(1/10 \text{ mile/bit}) \times (256 \text{ bits}) \times (10,000 \text{ events}).$$

Additional mileage may be recorded by increasing the number of bits in the C-block without degrading the accuracy of the odometer reading.

In summary, using the example above wherein the travel sensor 16 generates a signal to the microprocessor each one tenth of a mile, the 256 bits in the C-block 22 are used on an independant basis to record the number of signals generated by the travel sensor. Once the overflow condition occurs, the AB pair, representing the most significant portion of the mileage is incremented and the C-block is erased (cleared) for additional recording.

Figure 2A:
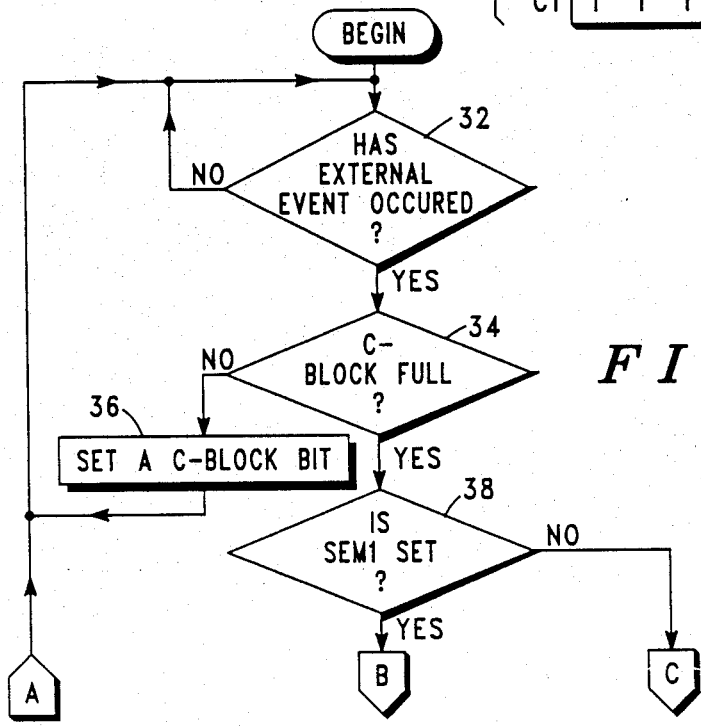
FIGS. 2a and 2b comprise a flowchart depicting a set of steps which may be used by a microcomputer for implementing the system of FIG. 1 in accordance with the present invention.
Figure 2B:
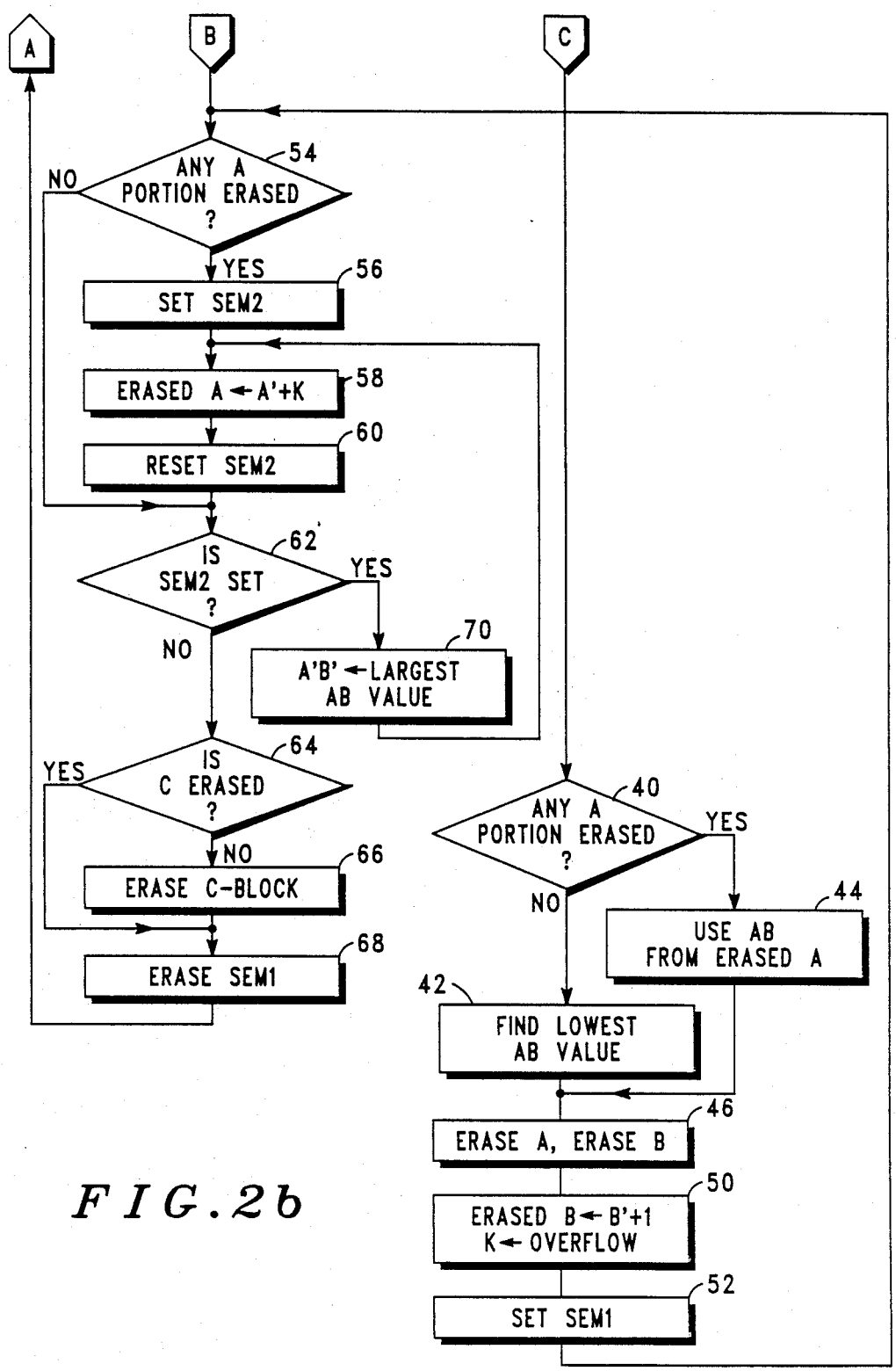

Now referring to FIGS. 2a and 2b, an implementation of the counting technique, using the three memory location groups (20, 21 and 22), is depicted in flowchart form. The flowchart provides a counting method for an implementation requiring two bytes in addition to the C-block, as described in FIG. 1.

The flowchart begins at block 32 in FIG. 2a where a test is performed to determine whether or not an external event has occurred (representing the signal provided by the travel sensor 16 in FIG. 1). If the event has not occurred, flow returns to block 32. Otherwise, flow proceeds to block 34 where a test is performed to determine whether or not an overflow condition in C-block is present, i.e. whether or not C-block is full. If not, flow proceeds to block 36 the occurrence of the external event is recorded in another bit in C-block. From block 36, flow returns to block 32.

If the overflow condition of the C-block is present, flow proceeds to begin the C-block overflow incrementation process. This process is initiated at block 38 where a test is performed to determine whether or not the first semaphore memory location (SEM1) has been previously been set; SEM1 =0? (An EEPROM bit is set when it is equal to 0, and reset, erased or cleared when it is equal to 1). SEM1 provides protection to the C-block overflow incrementation process from a potential power down condition to the odometer system. This is illustrated in the hypothetical example that follows.

Without the use of the SEMI signal as described, if the overflow condition was previously detected and the next most significant byte was just incremented when the power failed, the microcomputer would not be able to determine if it should perform another incrementation. If it did perform the incrementation, the odometer reading would be in error by, using the example previously given, 25.6 miles (256 bits × 1/10 mils/ bit). By using SEM1 as described in the flowchart of FIG. 2, an increased level of integrity is provided such that the greatest degree of error which could be experienced as a result of a power down condition is 1 bit (1/10 mile).

Returning to FIG. 2a, if SEM 1 has not been previously set, representing that the incrementation process had not been interrupted at this stage, flow proceeds from block 38 to block 40 of FIG. 2b where a test is performed to determine whether or not the A portion of either AB pair has been previously erased. (The A portion of an AB pair may have been erased at a previous time via execution of block 46 below).

If an A portion has been erased, the microcomputer selects the AB pair, from which that erasure occurred, as the AB pair to use for transferring data to in the incrementation process. This selection is depicted at block 44. If an A portion has not been erased, flow proceeds to block 42 where the AB pair containing the least value is selected as the pair for which the next subsequent transfer of data will occur.

From either block 42 or 44, flow proceeds to block 46 where the selected AB pair is prepared for a transfer of data thereto. This is accomplished by first erasing the A portion of the AB pair, followed by erasing the B portion of the selected A pair.

At block 50, the B portion from the non-erased AB pair (designated as B') is incremented and stored in the B portion of the erased AB pair. Any overflow resulting from this incrementation is stored in a microcomputer register, designated as K.

At block 52, SEM1 is set provided that the previous step was completed (internally set by the EEPROM as previously discussed), and flow proceeds to block 54 of FIG. 2b where the update for the A portion of the incrementation process is initiated. The process begins at block 54 where a test is performed to determine whether or not any A portion of an AB pair has been erased. This test is performed to prevent updated data, previously and validly written to the A portion, from being written over.

If an A portion of an AB pair has not been erased, flow proceeds to block 62, which will be discussed below.

If an A portion of an AB pair has been erased, flow proceeds to block 56 where SEM2 is set to indicate that the process of updating the A portion has begun.

At block 58, the overflow result (K) from the incrementation to the B portion is added to A' and the result is stored in the erased A portion.

At block 60, SEM2 is cleared, indicating that the A portion has been updated

At block 62 a test is performed to determine if SEM2 is set. If set, then the A portion has already been updated, and flow returns to block 58 to update the A portion of the AB pair. If SEM2 is not set, flow proceeds to block 64 where a test is performed to determine whether or not C-block has been erased. If it has not been erased, it is erased at block 66. Once it has been established that C-block is erased, flow proceeds to block 68 where SEM1 is reset. Flow then returns to the beginning of the flowchart at block 32.

Figure 3:
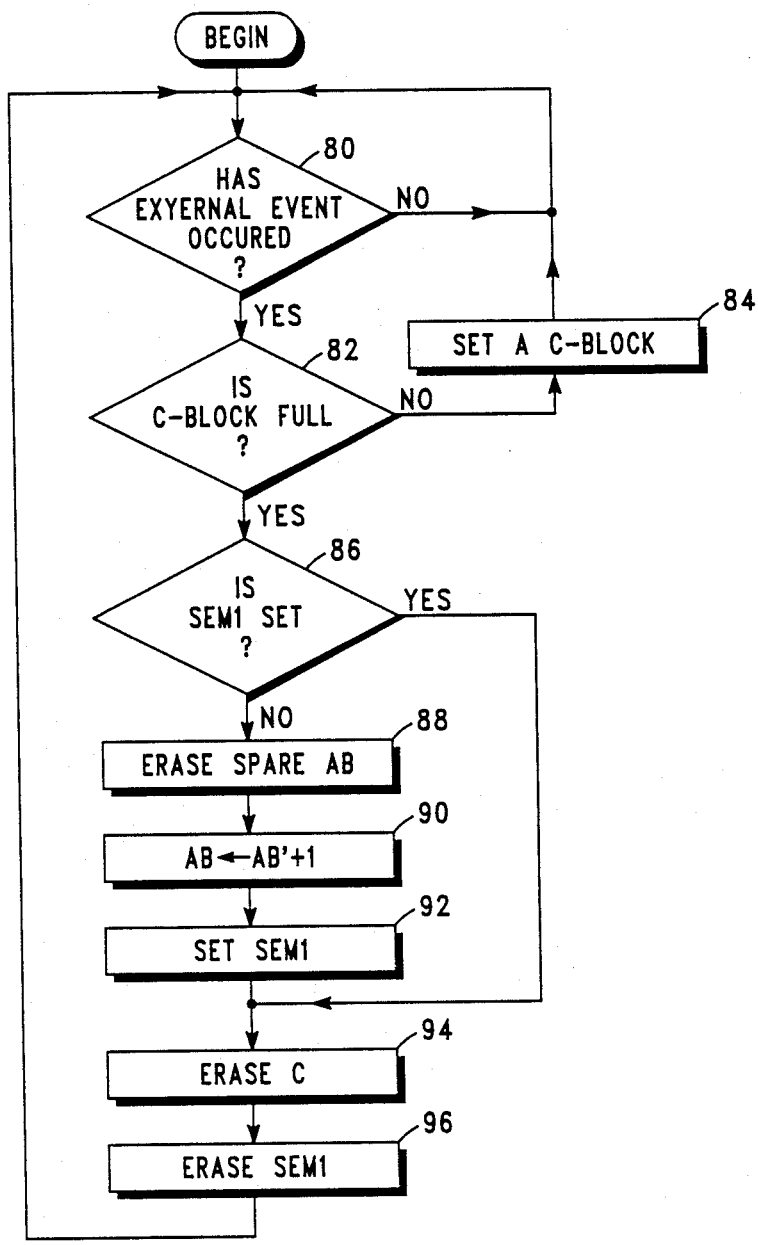
FIG. 3 is a flowchart depicting an alternate set of steps which may be used by a microcomputer for implementing the system of FIG. 1 in accordance with the present invention.

FIG. 3 shows an alternate set of steps which may be used for an implementation requiring only one byte in addition to the C-block. The distinction between the implementation in FIG. 2 and FIG. 3 turns on whether or not a carry bit is required within the most significant portion of the odometer number (from B to A). For a microcomputer having 8 bit arithmetic capability using an 8 bit wide EEPROM, the carry bit is required if the odometer is to reach its 24 bit maximum number capability (lessened by the EEPROM write/erase limitation), whereas for a microcomputer having 16 bit arithmetic capability using a 16 bit wide EEPROM, the carry bit is not required. In the latter case, for which the flowchart in FIG. 3 is intended, each AB pair referred to in FIG. 1 simply operates as a single 16 bit wide byte with the A portion of the byte representing the most significant 8 bits and the B portion representing the remaining 8 bits.

The flowchart of FIG. 3 begins at block 80 where a test is performed to determine whether or not an external event has occurred (representing the signal provided by the travel sensor 16 in FIG. 1). If the event has not occurred, flow returns to block 80. Otherwise, flow proceeds to block 82 where a test is performed to determine whether or not an overflow condition in C-block is present. If not, flow proceeds to block 84 where the occurrence of the external event is recorded in another bit of C-block. From block 84, flow returns to block 80.

If the overflow condition of the C-block is present, flow proceeds to begin the C-block overflow incrementation process. This process is initiated at block 86 where a test is performed to determine whether or not SEM1 has been previously set. SEM1 provides protection to the C-block overflow incrementation process from a potential power down condition to the odometer system, as was previously discussed.

If SEM 1 has been previously set, representing that the incrementation process has been interrupted, flow proceeds to block 94, subsequently discussed.

If SEM 1 has not been previously set, representing that the incrementation process has not been interrupted, flow proceeds to block 88 where the AB byte containing the lesser value is erased to allow an updated AB byte to be written therein.

At block 90, the non-erased AB byte (designated as AB') is incremented and stored in the erased AB byte.

At block 92, SEM1 is set, provided that the previous step was completed (internally set by the EEPROM as previously discussed), and flow proceeds to block 94 where the C-block is erased.

Finally, at block 96 SEMI is erased and flow returns to the beginning of the flow chart at block 80.

The present invention therefore provides a counting method and device for storing data in non-volatile memory that ensures that, on power down, a maximum of only a single bit, the least significant bit, of the count information may be lost. The counting method and device do not require the step of writing to EEPROM upon the detection of power down. Thus, the need for hardware relating to the detection of a power down condition and/or hardware for the maintenance of power, as recognized in the prior art, is eliminated.

While the invention has been particularly shown and described with reference to a preferred embodiment, it will be understood by those skilled in the art that various other modifications and changes may be made to the present invention described above without departing from the spirit and scope thereof. For example, other techniques that further enhance the integrity of the counting process, such as that described in U.S patent application number 667,039, filed 11-1-84, may obviously be joined with the present invention without departing from its scope.

What is claimed is:

1. A method of storing odometer information in non-volatile memory for a vehicle to maintain a record of distance traveled by said vehicle, comprising the steps of:
    (a) providing a predetermined number of non-volatile memory locations selected to correspond to a predetermined number of odometer information related events which will occur before an overflow condition occurs therein;
    (b) providing at least a first pair of non-volatile memory locations, which contains a least significant portion (lsp) and a most significant portion (msp), said lsp for storing data in response to overflows from said plurality of non-volatile memory locations, and said msp for storing data in response to overflows from said lsp;
    (c) providing a first semaphore location in non-volatile memory for indicating whether or not an update of said lsp has occurred;
    (d) providing a second semaphore location in non-volatile memory for indicating whether or not an update of said msp has occurred;
    (e) detecting an overflow of said plurality of non-volatile memory locations;
    (f) storing, in response to said overflow from said plurality of non-volatile memory locations and said first semaphore location, an updated count in the lsp; and
    (g) storing, in response to said second semaphore location and overflows from said lsp an updated count in said msp.

2. The method of storing, according to claim 1, wherein step (a) includes the step of setting each of said memory locations, for each external event received, in a sequential contiguous manner.

3. The method of storing, according to claim 1, wherein the plurality of non-volatile memory locations provided in step (a) is comprised of 256 bits for storing one of 256 increases of said count in each location.

4. The method of storing, according to claim 1, wherein said lsp is comprised of 8 bits.

5. The method of storing, according to claim 1, wherein said msp is comprised of 8 bits.

6. The method of storing, according to claim 1, wherein step (g) includes the step of resetting the second semaphore location immediately after storing the updated count in the msp.

7. The method of storing, according to claim 11, further including the step of resetting the non-volatile memory locations after completing step (g).

8. The method of storing, according to claim 7, further including the step of resetting the first semaphore location immediately after the step of resetting the predetermined non-volatile memory locations.

9. An odometer counting system having non-volatile memory for storing information which changes in response to a sequence of events indicative of distance traveled by a vehicle, comprising:
    a predetermined number of non-volatile memory locations selected to correspond to a predetermined number of said odometer information related events which will occur before an overflow condition occurs therein;
    at least a first and a second pair of non-volatile memory locations, wherein each pair contains a least significant portion (lsp) and a most significant portion (msp), said lsp's for storing data in response to overflows from said plurality of non-volatile memory locations, and said msp's for storing data in response to overflows from said lsp's;

a first semaphore location in non-volatile memory for indicating whether or not an update of one of said lsp's has occurred;

a second semaphore location in non-volatile memory for indicating whether or not an update of one of said msp's has occurred;

means for detecting an overflow of said plurality of non-volatile memory locations;

means for storing, in response to said overflow from said plurality of non-volatile memory locations and said first semaphore location, an updated count in one of the lsp's of said pairs; and means for storing, in response to said second semaphore location and overflows from said lsp's, an updated count in one of the msp's of said pairs.

* * * * *